United States Patent [19]

Hoag

[11] 4,345,331
[45] Aug. 17, 1982

[54] APPARATUS FOR GENERATING AN ELECTRIC FIELD

[75] Inventor: Ethan D. Hoag, East Boston, Mass.
[73] Assignee: Locke Technology, Inc., Wakefield, Mass.
[21] Appl. No.: 111,718
[22] Filed: Jan. 14, 1980
[51] Int. Cl.³ .............................................. H01S 3/08
[52] U.S. Cl. ..................................................... 372/87
[58] Field of Search ................... 331/94.5 PE; 315/3, 315/5.34; 313/296

[56] References Cited

U.S. PATENT DOCUMENTS 3,147,445 9/1964 Wuerker et al. ........................ 315/3

OTHER PUBLICATIONS

"RF Augmentation in $CO_2$ Closed-Cycle D. C. Electric-Discharge Convection Lasers", Appl. Phys. Lett., vol. 21, No. 1, Jul. 1, 1972, pp. 25-27; Eckbreath et al. "Molecular-Gas Discharge in a Rotating Electric Field" by Zhilinskii et al.; Sov. Phys. Tech. Phys., vol. 23, No. 11, Nov. 78.

Primary Examiner—William L. Sikes
Assistant Examiner—Léon Scott, Jr.
Attorney, Agent, or Firm—Schiller & Pandiscio

[57] ABSTRACT

Apparatus for generating with AC excitation, a substantially uniform electric field within a predetermined volume, typically in a region of a gas discharge device. The apparatus comprises an electrode assembly including a plurality of elongated electrodes disposed, equidistantly from one another and angularly displaced around a common axis so as to define the region of discharge. An approximately uniform discharge field is created within the discharge region by applying a harmonically varying potential to the electrodes, the phase of the applied potential at each electrode being a function of the relative angular position of that electrode.

33 Claims, 5 Drawing Figures

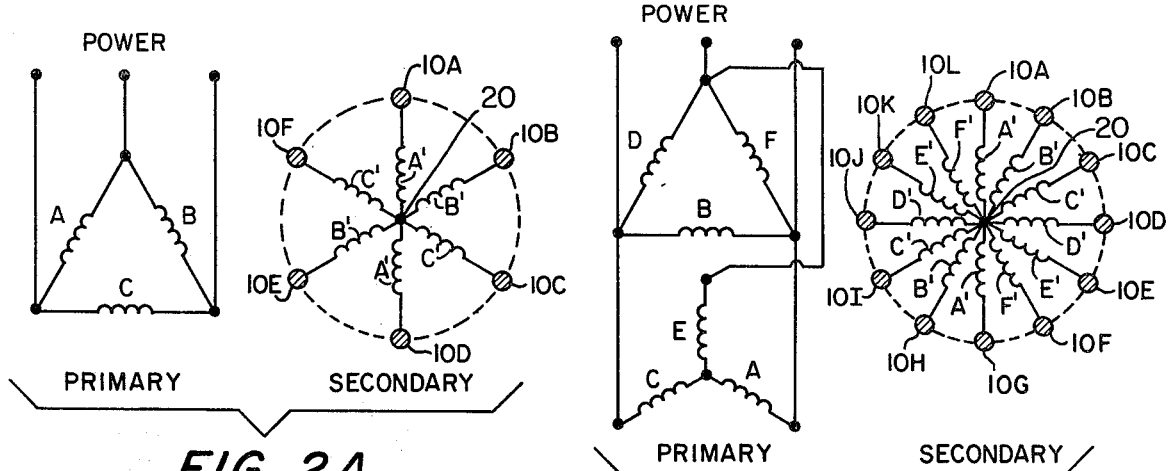
FIG. 2A
FIG. 2B
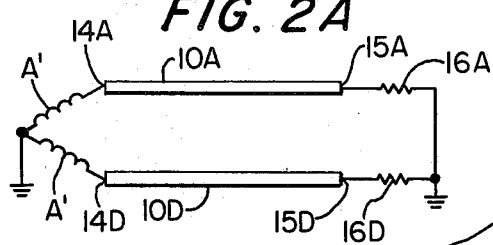
FIG. 2C
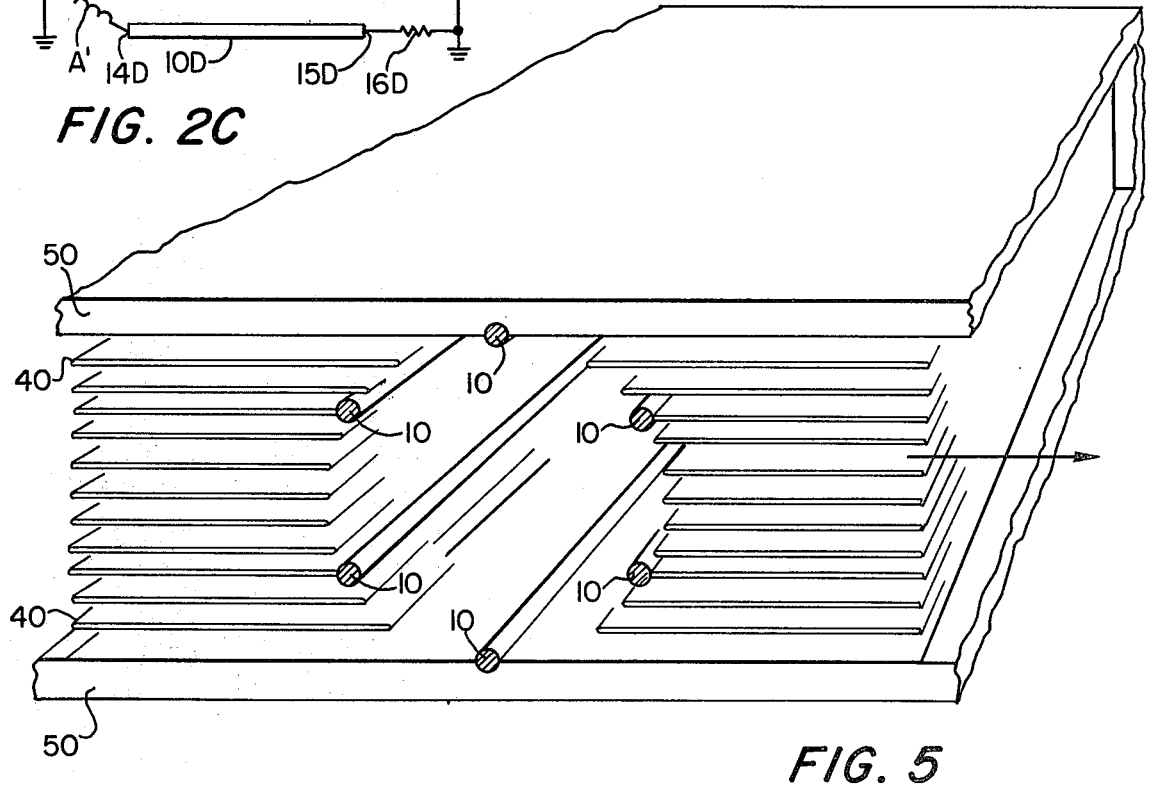
FIG. 5
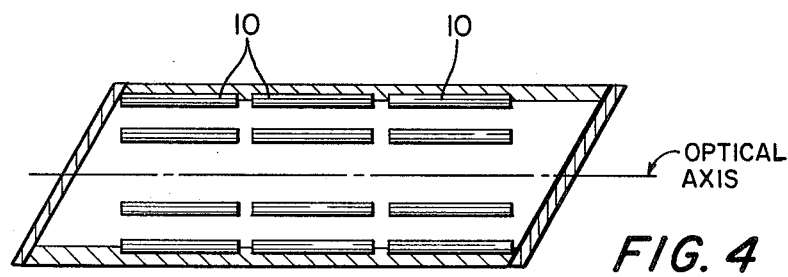
FIG. 4

APPARATUS FOR GENERATING AN ELECTRIC FIELD

The present invention relates generally to apparatus for generating an electrical field and more particularly to an electrode assembly for creating an electric field within a gaseous discharge in such a manner so that the field is approximately spatially uniform and constant in magnitude.

Spatially uniform and constant magnitude electric fields are useful, particularly though not necessarily limited, for creating an electrical discharge and thus excitation of a gas in gaseous electric lasers.

For example, lasers generally each comprise a laser cavity defining a column of active or lasing material disposed between a totally reflective mirror at one end of the column of material and a partially reflective mirror at the other end. The laser is typically primed by pumping the atoms of the lasing material, for example, by means of a flash of intense light or an electrical discharge field, to an excited energy state. With a preponderance of atoms in that state the system can be stimulated to produce a cascade of photons, all of the same wavelength, by triggering the emission of energy that causes the atoms to drop from the excited state to a lower energy state. A photon carrying this quantum of emitted energy, on striking an excited atom, causes it to emit a photon at the same frequency. Photons that travel to the sides of the column leave the system, but those that go to the ends of the column along its axis are reflected back and forth by the mirrors. The laser cavity is sized so as to function as a cavity resonator, and a beam of monochromatic, coherent light (ultraviolet, visible or infrared) rapidly builds in intensity as one atom after another is stimulated to emit photons with the same energy and direction. After the laser light has built up in this way it emerges through the partially reflective mirror at one end of the cavity as a high energy intense highly directional beam. Various types of lasers are described in U.S. Pat. Nos. 3,427,567; 3,720,885; 3,743,881; 3,777,279; 3,781,712; 3,860,887; 3,876,958; 4,041,414; 4,014,415; 4,068,192; 4,080,578; 4,085,386; 4,093,927; 4,096,449; 4,105,952; 4,114,113; 4,147,995; 4,150,343; 4,156,207 and the references cited therein and the paper entitled "Three Phase Excitation of a Hollow Cathode Laser" by Reid, R. D. and Collins, G. J.; Department of Electrical Engineering; Colorado State University; Fort Collins, Colorado; and Persson, Karl; National Bureau of Standards; Boulder, Colorado.

The active material of at least some gas lasers is actually a mixture of gases (for example, in a $CO_2$ laser the medium is actually a combination of carbon dioxide, nitrogen and helium) in which uniform excitation of the mixture at atmospheric pressure is not readily achieved. The gas mixture is therefore often preionized by any one of various known methods so as to obtain larger volumes of gas discharge and thus a higher energy output. In particular, the gas mixture is preionized by treating the mixture so that charged particles are present in the gas volume prior to initiation of the discharge. Once preionized the gas is subjected to an electric field so that discharge will occur.

In current practice such discharges are typically created by applying an AC power signal to the primary winding of a transformer and converting the resulting signal across the secondary winding of the transformer to DC using an appropriate rectifier bank. This DC power is then applied to electrodes often disposed within the gaseous medium. See, for example, U.S. Pat. No. 3,720,885. The field is usually obtained either by using plane parallel electrodes or by choosing that region of the field exhibiting approximate uniformity and discarding the remaining portion. In either approach the electrical discharge does not occur under the optimum conditions.

It is an object of the present invention to provide an improved apparatus for generating a substantially spatially uniform electric field directly from a harmonically varying potential.

Another object is to generate such a field within a gas medium so as to cause a more efficient electrical discharge within the medium.

Another object of the present invention is to provide a unique electrode assembly for use with gas discharge devices for creating a substantially uniform electric field of approximately constant magnitude throughout a well defined region of the gas of such devices.

Still another object of the present invention is to provide an improved gas laser in which the need for the rectification of AC power is eliminated.

Yet another object of the present invention is to provide an improved gaseous discharge laser having a more efficient gaseous discharge and higher energy output than comparable lasers of the prior art.

Another object of the present invention is to provide a gaseous discharge laser having a constantly changing direction of the electric field which tends to suppress the formation of the hot intense local current concentrations commonly referred to as arcs.

These and other objects of the present invention are achieved by an improved apparatus for generating an electric field within a predetermined volume, typically in a region of the gas of a gas discharge device. The apparatus comprises an electrode assembly including a plurality of elongated electrodes disposed with their elongated axes parallel to one another, equidistantly from and angularly displaced around a common axis so as to define the region of the gas to which the field is to be applied. An approximately uniform discharge field is created within the discharge region by applying a harmonically varying potential to the electrodes, the phase of the applied potential at each electrode being a function of the relative angular position of that electrode.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein:

FIG. 1 shows an embodiment of an electrode assembly designed in accordance with the present invention;

FIG. 2A schematically shows the means for applying the potential levels to the six electrodes of the assembly of FIG. 1 in accordance with the present invention;

FIG. 2B schematically shows the means for applying the AC potential levels to a twelve electrode assembly of a second embodiment of the present invention;

FIG. 2C schematically shows a cross-section of the embodiment of FIG. 2A taken along the axis of the A'-A' coils;

FIG. 4 is an axial cross-sectional view of the embodiment of FIG. 3 in a conventional Class I laser;

FIG. 5 shows the embodiment of FIG. 1 for use in a conventional Class III gas laser.

In accordance with the present invention a substantially spatially uniform electric field is created, as within a predetermined discharge region of the gas in a gaseous discharge device, by taking advantage of a well known solution to Laplace's equation. More particularly, it is known that an electric field within a closed circular cylindrical boundary is theoretically spatially uniform and of constant magnitude whenever the potential on the enclosed surface is sinusoidally distributed around the boundary. See, for example, Fano, R. M.; Chu, R. J.; and Adler, R. B., "Electromagnetic Fields, Energy and Forces", John Wiley & Sons, N.Y., p. 142 (1960).

Figure 1:
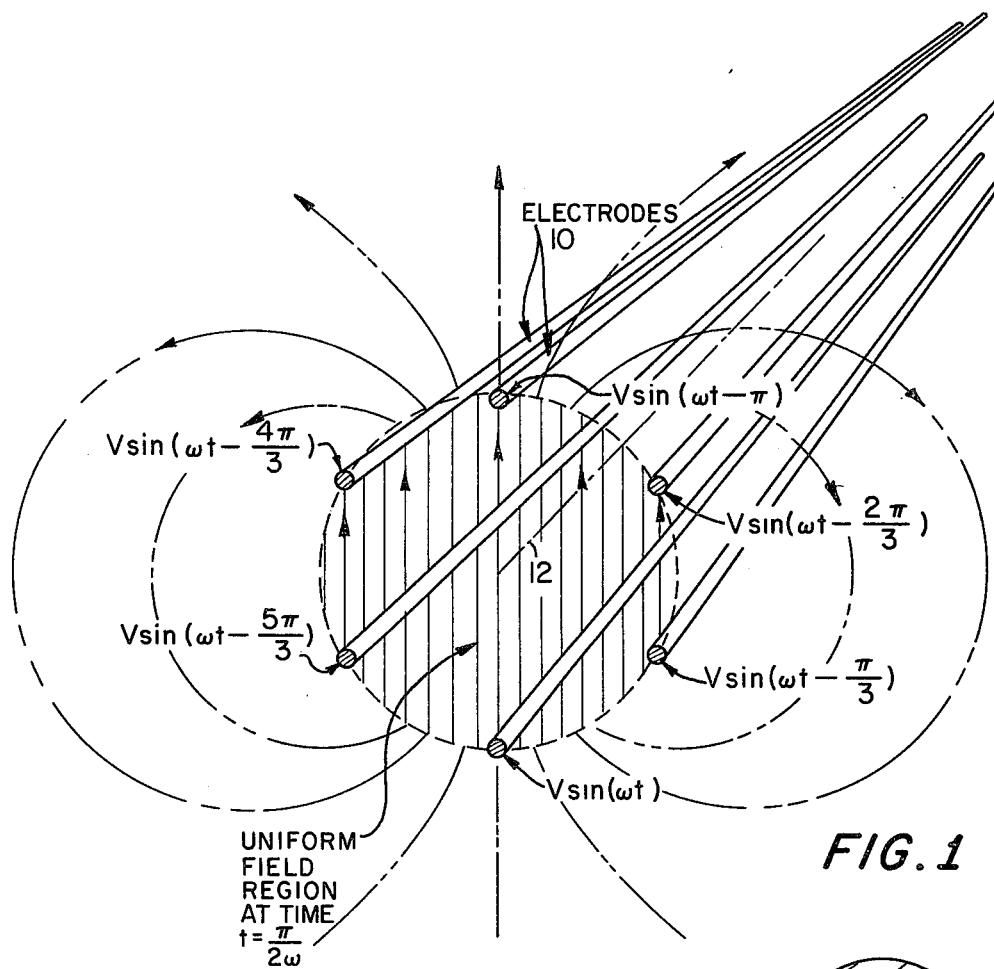

Referring to FIG. 1, in accordance with the present invention a spatially uniform field of constant magnitude is approximated by creating discrete harmonically, preferably sinusoidally, distributed potentials around a prescribed cylindrical boundary which surrounds the region of gaseous discharge. More particularly, the electrode assembly comprises a plurality of elongated rod-like electrically-conductive electrodes 10 disposed with each of their elongated axes parallel to and angularly displaced around central axis 12. Electrodes 10 are preferably all equidistantly radially spaced from the axis 12 so as to lie on and define the cylindrical boundary of the region within which the approximately uniform field is to be created. In other words, the axes of the electrodes are preferably parallel to one another and substantially parallel to the central axis. This substantial parallelism includes the case where electrode axes are slightly offset with regard to central axis 12 to form a somewhat helical configuration (too small to be shown distinctly in the drawing) which desirably prevents local gas density non-uniformities from cumulatively affecting an optical ray parallel to central axis 12. In all cases, a sinusoidally varying potential such as an AC voltage, is applied to the electrodes 10, the phase of the potential applied at each electrode being a function of the angular position of that electrode relative to the other electrodes.

The type of potential distribution required is preferably created by using a multi-phase source of alternating current power. As such the relative phase difference of each potential provided by the source is a function of the relative angular position of each of the electrodes 10. Accordingly, when using a multi-phase source of alternating power, the electrodes are associated in pairs or sets, each pair being connected to opposite sides of a phase winding of the source and diametrically opposed from one another about axis 12. Such connections are best illustrated in FIGS. 2A and 2B, wherein the electrodes are equiangularly displaced about the axis 12 since the phase angles of the applied potentials will be similarly equiangularly spaced. By using such a AC multi-phase source the field rotates with an angular velocity ($\omega$) proportional to the frequency of the power souce while providing within the rotating reference frame, i.e., the cylindrical boundary defined by the electrodes, a field whose magnitude remains substantially constant in time. The AC power may be at any frequency, with 50 or 60 Hertz up to 30 to 100 Megahertz being equally applicable in principle. Since the cylindrical boundary, defined by a discrete number of electrodes, is in actuality not a closed boundary, the degree to which the actual field approximates a uniform field depends upon the number of electrodes employed. The portion of the cylindrical region defined by the electrodes suffering the greatest amount of distortion is that portion of the boundary directly half way between two adjacent electrodes. Consequently, the degree to which the actual field approximates a uniform field depends on the number of electrodes, with the greater number of electrodes employed providing a better approximation.

Referring to FIGS. 2A and 2B, a standard three phase AC power source and a six phase AC power source are respectively shown for applying a potential to the corresponding six and twelve electrode assemblies. More particularly, in FIG. 2A, a single three phase AC-transformer is schematically illustrated for providing the required potentials to the six electrodes 10A–10F. The primary coils or windings A, B and C of the transformer are connected in a star or delta configuration in a manner well known in the art, with the latter configuration being shown in FIG. 2A. The secondary coils or windings A', B' and C' of the transformer are center tapped and these taps of each winding are preferably but not necessarily all connected together at 20. The opposite ends of each of the coils A', B' and C' are connected to the corresponding diametrically-opposed set of electrodes of the six electrode assembly. More particularly, as shown, the opposite ends of secondary coil A' are respectively connected to electrodes 10A and 10D, while the center tap is connected to 20. As such the AC potential applied to coils 10A and 10D will sinusoidally vary as a function of the frequency of the AC power provided to the primary winding A with the potential on electrode 10A being equal in magnitude but opposite in phase (180° apart) to the potential applied to electrode 10D. Similarly, opposite ends of secondary coil B' are respectively electrically connected to electrodes 10B and 10E, the opposite ends of secondary coil C' are respectively electrically connected to electrodes 10C and 10F; and the center taps of windings B' and C' are also all electrically connected to common connection 20. The AC power applied to primary windings B and C will produce respectively (a) the potentials on electrodes 10B and 10E equal in magnitude and opposite in phase to each other and (b) the potentials on electrodes 10C and 10F equal in magnitude and opposite in phase to each other. Since the potential applied to each of the primary windings A, B and C is 120° out of phase with the potential applied to the other two, the potentials on each of the electrodes 10A–10F will be 60° out of phase with each adjacent electrode. The 60° phase angle corresponds to the 60° angular spacing about the central axis 12 between the adjacent electrodes. Thus, the required harmonically varying potential on each electrode is produced.

As shown in FIG. 2C, secondary winding A' is center-tapped typically to ground and its halves are connected to respective electrodes 10A and 10D. However, preferably these individual electrodes 10A and 10D (exemplary of all the electrodes shown in FIG. 2A) are separately ballasted by connecting an electrical impedance in series with each to assure that each electrode carries an equal share of the total current. To this end, impedances 16A and 16D are respectively connected in series between corresponding halves of winding A' and ends 14A and 14D of electrodes 10A and 10D.

In FIG. 2B a similar arrangement is provided except that twelve electrodes are utilized with two three-phase transformers. The two three-phase transformers comprise a star-connected primary including primary coils or windings A, C and E, and a delta-connected primary including primary coils or windings B, D and F. The coil B is connected across coils A and C, the coil D is connected across coils C and E, and the coil F is connected across coils A and E so that when AC power is applied to each of the coils, the potential produced across each primary winding A, B, C, D, E and F will be consecutively 60° out of phase with each other. The secondary coils A', B', C', D', E' and F' are all connected to a common center tap and each are connected to diametrically-opposed electrodes. In particular, secondary coil A' is electrically connected at its opposite ends to an end of the corresponding electrodes 10A and 10G, secondary coil B' is electrically connected at its opposite ends to an end of the corresponding electrodes 10B and 10H, secondary coil C is electrically connected at its opposite ends to an end of the corresponding electrodes 10C and 10I, secondary coil D' is electrically connected at its opposite ends to an end of the corresponding electrodes 10D and 10J, secondary coil E' is electrically connected at its opposite ends to the ends of the corresponding electrodes 10E and 10K, and second coil F' is electrically connected at its opposite ends to an end of the corresponding electrodes 10F and 10L. The center taps of coils A' to F' inclusive are all electrically connected to common connection 20 so that when AC power is applied to the primary coils, the potential applied to each of the electrodes will sinusoidally vary 30° out of phase with the potential on the adjacent electrodes. Accordingly, the twelve electrodes are equiangularly spaced 30° apart around the common axis.

The phase splitting technique described with respect to FIGS. 2A and 2B may be carried further by appropriate use of still more transformers connected in star, delta combinations and in principle any number of splits may be accomplished to more closely approximate a uniform field.

Applying a sinusoidally varying potential on a cylindrical boundary not only approximates a uniform field within the cylindrical boundary, but also creates a dipole field outside the boundary. See Fano et al, "Electromagnetic Fields, Energy and Forces"., supra. Accordingly, the discrete potential distributions provided by the electrodes 10 will approximate a dipole field outside the cylindrical boundary generally defined by the electrodes. This dipole field is a highly non-uniform field and is, in general, undesirable, particularly in gaseous discharge lasers since discharge could occur in this field. Therefore, in order to render the electrode assembly of the present invention useful in such situation, means are provided for preventing electrical discharge occurring outside the boundary where such dipole fields can be formed.

The type of means for preventing such discharge within such dipole fields is dependent on the type of gaseous discharge device in which the electrode assembly is employed.

Figure 6:
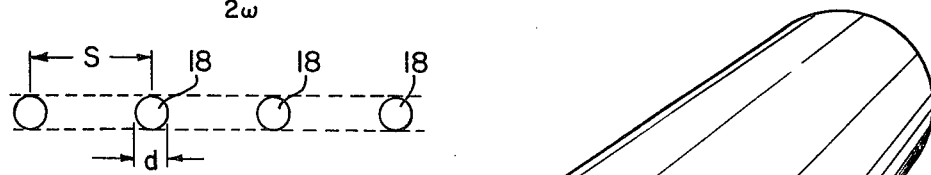
FIG. 6 is a schematic illustration of an alternative form of electrode useful in the present invention.
Figure 3:
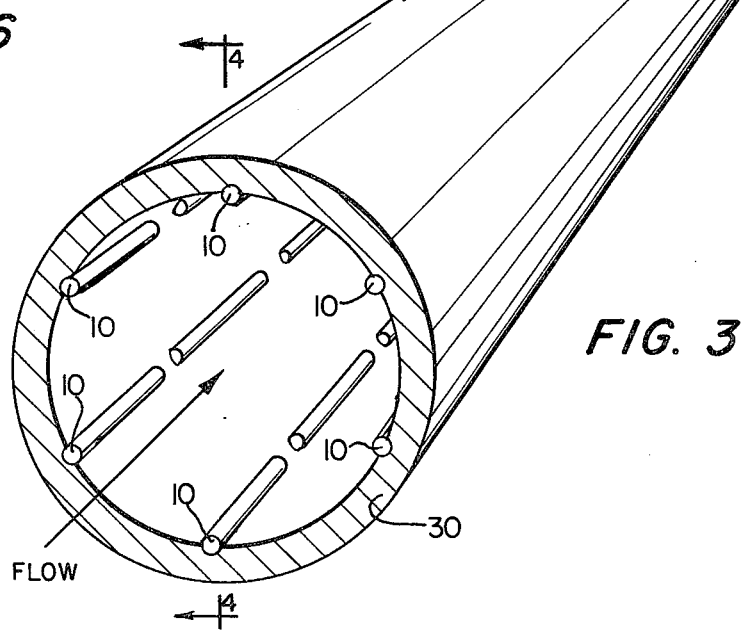
FIG. 3 shows a schematic of an embodiment of the present invention for use in a conventional Class I or Class II laser.

For example, referring to FIG. 3, the means for preventing electrical discharge within a dipole field outside the cylindrical boundary comprises a dielectric cylindrical wall 30, wherein the radially outer portions of the electrodes 10 are embedded at the appropriate locations on the inner surface of the wall 30. This arrangement is particularly useful in a Class I or non-flowing laser (such as shown in FIG. 4), or a Class II or axially-flowing laser. Preferably, the electrodes are segmented as shown in FIG. 3 with a segment of each electrode being of the same length as and radially aligned (with respect to axis 12) with respect to a corresponding segment of each of the other electrodes. Such segmentation is believed to be highly desirable in order to provide a stable discharge in the cylindrical discharge region defined by electrodes 10. The segments of each elongated electrode need not be per se elongated themselves but can even be spheres 18, as shown in the electrode illustrated in FIG. 6, so that the electrode appears as a string of beads held in a dielectric support indicated by dotted lines. Note that the diameters (d) of spheres 18 are small compared to the respective spacing (s) from one another along the respective axes of the electrodes.

Referring to FIG. 5, the means for preventing electrical discharge within a dipole field in a Class III, crossflow type laser, (such as shown in U.S. Pat. No. 3,720,885) is a "porous" dielectric assembly. The assembly comprises a plurality of planar parallel plates 40 made of a dielectric material such as an appropriate ceramic. The plates are all oriented with their planes parallel to the gas flow (which flows transversely to the center axis defined by the position of the electrodes) as well as the general orientation of the electrodes so that the plates do not substantially interfere with the flow but substantially interfere with any discharge from the dipole field otherwise created by the potential applied to the electrodes. As shown the plates extend to both sides of the cylindrical boundary defined by the electrodes leaving the cylindrical region within the electrodes open for discharge to occur. A dielectric plate 50 extends above and below the cylindrical boundary. The dielectric plates may be replaced by other equivalent structures. For example, a honeycomb structure made of a dielectric material such as a suitable ceramic can be placed on both sides of the electrodes as a substitute for plates 40. The honeycomb structure is shaped so as to include a large number of honeycomb channels each open at opposite ends and aligned with the gas flow. The specific shape of the dielectric honeycomb structure may be of any desired shape and may be constructed similarly to the insulator honeycomb structures shown in U.S. Pat. No. 3,720,885.

It will be appreciated that the dielectric plates of FIG. 5 and the alternative honeycomb structure described will in addition to preventing current flow in the dipole field region, will also function to straighten the gas flow into the gas discharge region within the cylindrical boundary defined by electrodes 10.

In the embodiment of FIG. 5 or the alternative honeycomb structure described, the segmentation of electrodes 10 in a manner similar to that described with respect to FIG. 3 may or may not be necessary depending on whether or not an electron beam is used to stabilize the discharge.

The electrode assembly of the present invention has the advantage that a substantially uniform field can be created directly from a harmonically varying potential source. This is particularly useful where the electrode assembly is utilized for creating an electrical discharge and thus excitation of a gas in gaseous electric laser since it eliminates the need for rectifier banks. Further, by providing a substantially uniform field, within the active medium of a gas laser a more efficient electrical discharge will occur within the medium producing a higher energy output than comparable lasers of the prior art.

The electrode assembly of the present invention also has the advantage that the constantly changing direction of the electric field tends to suppress the formation of the hot intense local current concentrations commonly referred to as arcs. In particular, if the rotational speed of the electrical field is equal to or greater than the speed (typically around 30 to 40 thousand centimeters per second) of an advancing arc streamer, the streamer cannot close a complete circuit across the active region and cannot evolve into an arc.

The uniformity of the electric discharge resulting from the electric field produced by the electrode assembly of the present invention is further enhanced in flowing embodiments if the frequency is such that several revolutions of the electric field occur during the time necessary for a molecule of gas to move across the active region.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. Apparatus for generating an electric field within a region, said apparatus comprising:
   an electrode assembly including a plurality of elongated electrodes disposed with their elongated axes substantially parallel to one another, substantially equidistantly from and angularly displaced from one another around a common axis so as to define said region; and
   means for applying to said electrodes a harmonically varying, multi-phase potential so that the potential at each electrode is phase dependent and the phase of the potential at each electrode is a function of the relative angular position of that electrode so as to approximate a uniform electric field within said region.

2. Apparatus according to claim 1 wherein said harmonically varying potential is a sinusoidally varying potential.

3. Apparatus according to claim 1, wherein said electrodes are equiangularly spaced around said common axis.

4. Apparatus according to claim 1, wherein each elongated electrode is separately ballasted by connecting in series therewith an electrical impedance sufficient to assure that each electrode carries an equal share of the total current through said assembly.

5. Apparatus according to claim 1 wherein said electrodes are associated in pairs, with the electrodes of each pair being diametrically opposed about said common axis.

6. Apparatus according to claim 5, wherein said means for applying said potential comprises means for applying to the respective electrodes of each said pair AC potentials which are always of an equal magnitude and opposite in phase.

7. Apparatus according to claim 6, wherein said means for applying said potential comprises a transformer including a plurality of primary windings and a like plurality of secondary windings, said secondary windings being all connected to a common tap, wherein the opposite ends of each of said secondary winding are respectively electrically connected to an end of the electrodes of a corresponding pair, and the other end of each of said electrodes of said pair is electrically connected to said common tap.

8. Apparatus according to claim 7 wherein said common tap is the center tap of said secondary windings.

9. Apparatus according to claim 1 further including means for preventing electrical discharge outside of said region.

10. Apparatus according to claim 9 wherein said means for preventing electrical discharge comprise a dielectric hollow cylinder having an interior wall disposed around and coaxial with said common axis, said electrodes being partially embedded in the interior wall of said cylinder.

11. Apparatus according to claim 10 wherein said electrodes each include a radially outer portion embedded in said wall.

12. Apparatus according to claim 9 wherein each of said electrodes comprises a plurality of segments.

13. Apparatus according to claim 12 wherein each of said segments of one electrode is of an equal length and is radially aligned along said common axis with respect to a corresponding segment of each of the other of said segments.

14. Apparatus according to claim 12 wherein each of said segments are spherical and are spaced apart along the axis of said electrode by a distance substantially greater than the diameter of said segments.

15. Apparatus according to claim 9 wherein said means for preventing electrical discharge comprises a plurality of planar parallel dielectric plates positioned adjacent to and parallel with respect to said electrodes.

16. In a gas laser having a resonant optical cavity having an optical axis and optically reflective elements disposed at opposite ends of said cavity along said axis, one of said elements being partially optically transmissive a laser-active gas medium disposed within said cavity, the improvement comprising:
   an electrode assembly for creating a discharge field within said cavity, said assembly including a plurality of elongated electrodes disposed substantially parallel to said axis, wherein said electrodes are equidistantly spaced from and angularly displaced around said axis; and
   means for applying a harmonically varying, multi-phase potential to said electrodes so that the potential at each electrode is phase dependent and the relative phase of the potential applied to each of said electrodes is a function of the relative angular position of each of said electrodes.

17. A gas laser according to claim 16 wherein the axes of elongation of said electrodes are disposed to form a helix about said optical axis.

18. A gas laser according to claim 16 wherein said harmonically varying potential is a sinusoidally varying potential.

19. A gas laser according to claim 18 wherein said electrodes are disposed equiangularly around said axis.

20. A gas laser according to claim 19 wherein said electrodes are associated in pairs with the electrodes of each pair being disposed at diametrically opposite sides of said axis.

21. A gas laser according to claim 20 wherein said means for applying said potential comprises means for applying to the respective electrodes of each said pair AC potentials which are always of an equal magnitude and opposite in phase.

22. A gas laser according to claim 21 wherein said means for applying said potential comprises a transformer including a plurality of primary windings and a like plurality of secondary windings, said secondary windings being all connected in common to form a common tap, wherein each of the opposite ends of each said secondary winding is electrically connected to an end of a respective one of the electrodes of a corresponding pair, and the other end of said electrode is electrically connected to said common tap.

23. A gas laser according to claim 22 wherein said common tap is the center tap of said secondary windings.

24. A gas laser according to claim 21 wherein said means for preventing electrical discharge include means for controlling the flow direction of said gas medium.

25. A gas medium according to claim 24 wherein said means for preventing electrical discharge and said means for controlling the flow direction of said gas medium comprises a plurality of planar, parallel dielectric plates positioned parallel to the gas flow direction and parallel to said common axis.

26. A gas laser according to claim 18 further including means for preventing electrical discharge outside of said region.

27. A gas laser according to claim 26 wherein said means for preventing electrical discharge comprises a dielectric hollow cylinder disposed around and coaxial with said common axis, said electrodes being partially embedded in the interior wall of said cylinder.

28. A gas laser according to claim 27 wherein said electrodes each include a radially outer portion embedded in said wall.

29. A gas laser according to claim 28 wherein said gas medium flows through said cylinder parallel to said common axis.

30. A gas laser according to claim 26 wherein each of said electrodes comprises a plurality of spaced-apart, axially aligned segments.

31. A gas laser according to claim 30 wherein each segment of one electrode is of equal length as and is radially aligned along said common axis with respect to a corresponding segment of each of the other of said electrodes.

32. A gas laser according to claim 30 wherein said segments are spherical, the diameters of the segments being substantially less than the spacing therebetween.

33. A gas laser according to claim 26 wherein said gas medium flows through said region transversely to said common axis.

* * * * *